US011111361B2

(12) United States Patent
Green et al.

(10) Patent No.: US 11,111,361 B2
(45) Date of Patent: *Sep. 7, 2021

(54) ENERGY ABSORBING BLENDS

(71) Applicant: DESIGN BLUE LIMITED, Hove (GB)

(72) Inventors: Philip Charles Green, Stevenage (GB); Richard Martin Palmer, Boxmoor (GB)

(73) Assignee: DESIGN BLUE LIMITED, Hove (GB)

(*) Notice: Subject to any disclaimer, the term of this patent is extended or adjusted under 35 U.S.C. 154(b) by 0 days.

This patent is subject to a terminal disclaimer.

(21) Appl. No.: 14/310,631

(22) Filed: Jun. 20, 2014

(65) Prior Publication Data
US 2014/0303270 A1    Oct. 9, 2014

Related U.S. Application Data

(63) Continuation of application No. 13/753,633, filed on Jan. 30, 2013, now Pat. No. 8,856,971, which is a continuation of application No. 12/633,454, filed on Dec. 8, 2009, now Pat. No. 8,387,170, which is a continuation of application No. 10/561,763, filed as application No. PCT/GB2004/002784 on Jun. 25, 2004, now abandoned.

(30) Foreign Application Priority Data
Jun. 25, 2003  (GB) .................................. 0314824

(51) Int. Cl.
| C08L 23/06 | (2006.01) |
| C08L 83/08 | (2006.01) |
| A63B 71/08 | (2006.01) |
| D01F 8/14 | (2006.01) |
| F16F 1/36 | (2006.01) |
| A41D 31/28 | (2019.01) |
| D01F 8/16 | (2006.01) |
| C08J 3/00 | (2006.01) |
| D01F 8/06 | (2006.01) |
| C08J 5/00 | (2006.01) |
| A41D 13/00 | (2006.01) |
| A41D 13/06 | (2006.01) |
| C08L 83/04 | (2006.01) |
| C08L 85/04 | (2006.01) |

(52) U.S. Cl.
CPC .............. *C08L 23/06* (2013.01); *A41D 13/00* (2013.01); *A41D 13/065* (2013.01); *A41D 31/28* (2019.02); *A63B 71/08* (2013.01); *C08J 3/005* (2013.01); *C08J 5/00* (2013.01); *C08L 83/08* (2013.01); *C08L 83/08* (2013.01); *C08L 85/04* (2013.01); *D01F 8/06* (2013.01); *D01F 8/14* (2013.01); *D01F 8/16* (2013.01); *F16F 1/3605* (2013.01); *C08L 2207/066* (2013.01)

(58) Field of Classification Search
CPC ........ C08L 83/08; A63B 71/08; A63B 71/081
See application file for complete search history.

(56) References Cited

U.S. PATENT DOCUMENTS

| 3,277,026 A | 10/1966 | Newnham et al. |
| 3,663,587 A | 5/1972 | Holman |
| 3,833,952 A | 9/1974 | Rosenberg |
| 3,997,214 A | 12/1976 | Jacobs |
| 4,371,493 A | 2/1983 | Minuto |
| 4,610,917 A | 9/1986 | Yamamura et al. |
| 5,104,717 A | 4/1992 | Landa et al. |
| 5,319,021 A | 6/1994 | Christy |
| 5,498,640 A | 3/1996 | Witt et al. |
| 5,544,432 A | 8/1996 | Kita |
| 5,611,153 A | 3/1997 | Fisher et al. |
| 5,639,445 A | 6/1997 | Curtis et al. |
| 5,741,568 A | 4/1998 | Rudy |
| 5,854,143 A | 12/1998 | Schuster et al. |
| 5,911,314 A | 6/1999 | Urella et al. |
| 6,066,710 A | 5/2000 | Becker et al. |
| 6,093,468 A | 7/2000 | Toms et al. |
| 6,313,220 B1 | 11/2001 | Materne et al. |
| 6,701,529 B1 | 3/2004 | Rhoades et al. |
| 6,884,823 B1 | 4/2005 | Pierick et al. |
| 6,913,802 B1 | 7/2005 | Plant |
| 6,943,223 B1 | 9/2005 | Bleijenberg et al. |

(Continued)

FOREIGN PATENT DOCUMENTS

| CH | 513224 A | 9/1971 |
| EP | 0664970 | 8/1995 |

(Continued)

OTHER PUBLICATIONS

Database WPI, Section Ch, Derwent Publications Ltd., XP002251188, 1994.
Derwent abstract of SU 211096A, Lebedev Synth Rubber R. 1968.
International Search Report for International Application No. PCT/GB02/05886; dated Aug. 22, 2003.
International Search Report for International Application No. PCT/GB2004/002784, dated Sep. 27, 2004.
Wacker Silicones, AK 1 000 000, Jun. 25, 2008.
Wacker Silicones, AK 1 000, May 19, 2008.
Wacker Silicones, AK 10 000, May 6, 2008.
Wacker Silicones, AK 100, Jun. 22, 2008.

(Continued)

*Primary Examiner* — Liam J Heincer
(74) *Attorney, Agent, or Firm* — Marshall, Gerstein & Borun LLP

(57) ABSTRACT

A composite material which is elastic, which exhibits a resistive load under deformation which increases with the rate of deformation, which is unfoamed or foamed, comminuted or uncomminuted and which comprises i) a first polymer-based elastic material and ii) a second polymer-based material, different from i), which exhibits dilatancy in the absence of i) wherein ii) is entrapped in a solid matrix of i), the composite material being unfoamed or, when foamed, preparable by incorporating ii) with i) prior to foaming.

35 Claims, 7 Drawing Sheets

(56) References Cited

U.S. PATENT DOCUMENTS

| | | |
|---|---|---|
| 6,949,209 B2 | 9/2005 | Zander et al. |
| 7,381,460 B2 | 6/2008 | Palmer et al. |
| 2001/0045464 A1 | 11/2001 | Dvorkis et al. |
| 2003/0034198 A1 | 2/2003 | Cushman et al. |
| 2003/0034658 A1 | 2/2003 | Cate et al. |
| 2003/0164618 A1 | 9/2003 | Gentle |
| 2003/0232222 A1 | 12/2003 | Anderson et al. |
| 2004/0038018 A1 | 2/2004 | Anderson et al. |
| 2004/0068063 A1 | 4/2004 | Cornelis Bleijenberg et al. |
| 2004/0171321 A1 | 9/2004 | Plant |
| 2004/0173422 A1 | 9/2004 | Deshmukh et al. |
| 2005/0089185 A1 | 4/2005 | Allen |
| 2005/0269829 A1 | 12/2005 | Nilsrud et al. |
| 2006/0234577 A1 | 10/2006 | Wagner et al. |
| 2007/0029690 A1 | 2/2007 | Green et al. |
| 2008/0141570 A1 | 6/2008 | Nearman et al. |
| 2009/0324927 A1 | 12/2009 | Palmer et al. |

FOREIGN PATENT DOCUMENTS

| | | |
|---|---|---|
| EP | 0819715 A1 | 1/1998 |
| EP | 1130053 A2 | 9/2001 |
| EP | 1458254 A2 | 9/2004 |
| GB | 1240390 A | 7/1971 |
| GB | 1381571 | 1/1975 |
| GB | 1551483 A | 8/1979 |
| GB | 2349798 A | 11/2000 |
| JP | 04342742 | 11/1992 |
| JP | 04342743 | 11/1992 |
| JP | 05331365 | 12/1993 |
| JP | 6220242 | 8/1994 |
| JP | 7216138 | 8/1995 |
| JP | 08151500 | 6/1996 |
| TW | 424039 B | 3/2001 |
| TW | 522157 B | 3/2003 |
| WO | WO-94/06851 A1 | 3/1994 |
| WO | WO-98/15795 A1 | 4/1998 |
| WO | WO-03/022085 A2 | 3/2003 |
| WO | WO-03/055339 A2 | 7/2003 |

OTHER PUBLICATIONS

Wacker Silicones, AP 200, Jun. 18, 2008.

"The Manufacture of TPE. Gaiters and Bellows by the Injection—Extrusion Blow Moulding Process", Thermoplastic Elastomers—II, Processing for Performance, vol. II, 3 pages.

Cox et al., "Acoustic Absorbers and Diffusers: Theory, Design and Application", 2004, 2 pages.

Wetzel et al., Advanced Body Armor Utilizing Shear Thickening Fluids, Composite Materials Research, 23rd Army Science Conference, Orlando, Florida (Dec. 3, 2002).

Communication pursuant to Article 94(3) EPC, European patent application No. 04743132.5, dated Jul. 21, 2017.

| | F (KN) @ 50J | | |
|---|---|---|---|
| | 19.1 |  |  |
| | 16.1 |  |  |
| | 16.6 |  |  | ptrans
ENERGY ABSORBING BLENDS

FIELD OF THE INVENTION

This invention relates to applications where rate sensitivity can provide a performance advantage; e.g. energy absorbent impact systems designed for the protection of humans, animals or objects from damage by impact; these are referred to hereinafter as impact protection systems.

BACKGROUND

Conventionally, impact protection systems have employed, as the energy absorbing material, elastomeric foams or similar relatively soft, resiliently compressible materials. However, only limited protection is achieved thereby. In some systems, this energy absorbing material is employed in combination with a rigid member the purpose of which is to spread the impact force over a greater area and therefore reduce its effect. However, such systems tend to be inflexible and uncomfortable if in contact with a human body. Most vulnerable areas of the body which require protection, e.g. elbows and knees, undergo significant changes in geometry and thus any attempt to match a rigid load-spreading shape will usually fail. One solution is to introduce articulation into the rigid element but this can compromise performance and increases cost.

More recently, proposals have been made for the use of strain-rate sensitive shear thickening silicone putty materials, sometimes known as silicone dilatants, in or as energy absorbing materials in impact absorption systems. By a strain-rate sensitive shear thickening material or dilatant, we mean a material which viscous flows at low rates of strain deformation but, at an elevated strain rate of deformation undergoes a substantial increase in viscosity with rate of change of deformation. At significantly higher deformation rates, such as those induced by a sudden impact, the material becomes substantially stiff or rigid. For example, U.S. Pat. No. 5,599,290 describes a bone fracture prevention garment which employs, as the dilatant or shear-thickening material, a dispersion of solid particles in a viscously fluid. GB-A-2349798 describes an energy absorbing pad including a putty-like dilatant. However, in both cases, the dilatant has to be contained in an envelope because of its non self-supporting nature. The products therefore tend to have limited flexibility, are prone to damage by puncture, and require relatively complex and expensive manufacturing processes. These products also tend to be heavy due to the relatively high density of the dilatant, which can be above 1000 kg/m3, and suffer from migration of the dilatant within the envelope as the dilatant will exhibit viscous flow at even very low levels of loading.

Other approaches for the utilisation of silicone dilatants have been to combine this material with a resilient carrier such as polyurethane foam.

In our copending International patent publication WO 03/055339 we have described and claimed a self supporting energy absorbing composite comprising:
  i) a solid foamed synthetic polymer matrix;
  ii) a polymer-based dilatant, different from i), distributed through the matrix and incorporated therein during manufacture of i); and
  iii) a fluid distributed through the matrix, the combination of matrix dilatant and fluid being such that the composite is resiliently compressible;
and a self supporting energy absorbing composite comprising:
  i) a solid, closed cell foam matrix;
  ii) a polymer-based dilatant, different from i), distributed through the matrix; and
  iii) a fluid distributed through the matrix, the combination of matrix dilatant and fluid being such that the composite is resiliently compressible.

BRIEF DESCRIPTION OF THE DRAWINGS

FIG. 10 shows the microballoons of Expancel, and FIG. 11 shows the structure of the material after being subjected to a softening process.

DETAILED DESCRIPTION

Figure 1:
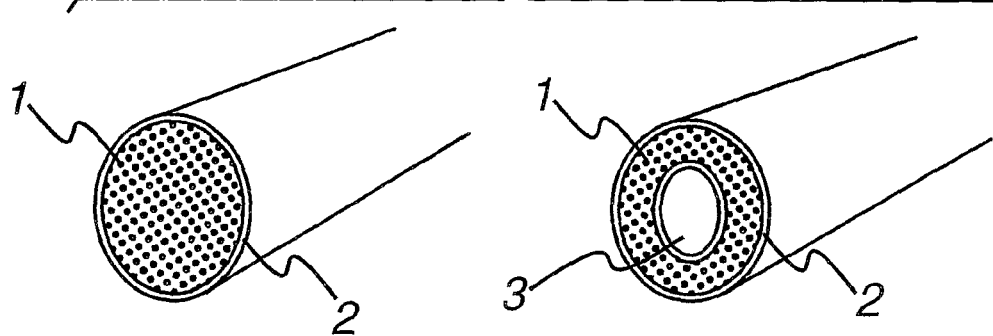
FIG. 1 shows (left) a fiber which comprises a core of a second material (1) within a sheath of a first material (2), as disclosed herein, and (right) a fiber which comprises a core of a second material (1), a sheath of a first material (2), and a hollow containing a gas (air) (3).

The present invention provides an energy absorbing material suitable for use in or as an impact absorption material; and which is self-supporting and wherein the density can be tuned to specification applications; for example, from about 1150 kg/m3 in the as blended condition and any intermediate density down to 100 kg/m3 in the foamed form.

According to the present invention, there is provided a composite material which is elastic, which exhibits a resistive load under deformation which increases with the rate of deformation, which is comminuted or uncomminuted and which comprises i) a first polymer-based elastic material and ii) a second polymer-based material, different from i), which exhibits dilatancy in the absence of i) wherein ii) is entrapped in a solid matrix of i), the composite material being unfoamed or, when foamed, preparable by incorporating ii) with i) prior to foaming.

It is preferred that the composite material is resistant to permanent set under all types of loading; e.g. compression, tension or shear or any combination thereof. By a solid matrix is meant herein a matrix material which retains its own boundaries without need of a container.

The composite material of this invention may be unfoamed as such or as a precursor to a composite material which is subsequently to be foamed (that is, foamed after ii) has become entrapped in a solid matrix of i)).

Preferably, the first material i) and second material ii) are in intimate admixture; for example, as attainable by blending i) and ii) together. By blending is meant herein the mixing together of polymer based constituents i) and dilatant ii) in the semi-molten or molten state to form a composite material wherein the first material i) and the second material ii) are in intimate admixture.

In addition to being self-supporting, the composite material of the invention offers a degree of impact protection which can exceed that of current rigid systems and moreover, in the preferred embodiment wherein it is both flexible and resilient under all types of loading, it has the ability to conform to the geometry of what it is designed to protect by maintaining intimate contact through relatively large changes in geometry. This is important for the design of protective components because induced damage is a function of the maximum force resulting from the impact divided by the area over which this force is distributed. The composite material of the invention enables both a reduction in the force and an increase in the area on which the force acts or is reacted, thereby significantly reducing the resulting pressure or stress transmitted for a given impact event. It also offers the ability to exhibit some conformity to the impactor and thus produce additional force absorption as well as favourable geometry in terms of abrasion resistance. By means of the invention, it is also possible to achieve improved performance compared to the use of an equivalent mass of dilatant when used on its own.

The first material i) may be one wherein the polymer comprising the first material i) comprises EVA or an olefin polymer, for example polypropylene or an ethylene polymer such as high pressure polyethylene (LDPE), LLDPE or HDPE.

Preferably, the polymer comprising the first material i) comprises an elastomer. While natural elastomers, e.g. latex rubbers, may also be used, our preference is for synthetic elastomers (such as neoprene), more preferably synthetic thermoplastic elastomers such as thermoplastic polyesters. Preferred classes of such elastomers include elastomeric polyurethanes and elastomeric EVAs (ethylene/vinyl acetate copolymers); others such as silicone rubbers and EP rubbers, e.g. EPDM rubbers may also be suitable.

Other solid plastics materials may also be suitable for use as the polymer constituent of the first material i) provided that they too exhibit an appropriate level of resilience. Any polymer-based material, different from i), which exhibits dilatancy and can be incorporated into the chosen elastic constituent(s) of first material i) may be used as second material ii). By a polymer-based material which exhibits dilatancy is meant a material in which the dilatancy is provided by one or more polymers alone or by a combination of one or more polymers together with one or more other components, e.g. finely divided particulate material, viscous fluid, plasticiser, extender or mixtures thereof, and wherein the polymer is the principal component. In one preferred embodiment, the polymer comprising the second material ii) is selected from silicone polymers exhibiting dilatant properties. The silicone-based polymer is preferably selected from borated siloxane polymers. For example, the dilatant may be selected from filled or unfilled polyborodimethylsiloxanes (PBDMSs) or any number of polymers where PBDMS is a constituent. The dilatancy may be enhanced by the inclusion of other components such as particulate fillers.

The dilatant may be combined with other components in addition to the components providing the dilatancy, e.g. fillers, plasticisers, colorants, lubricants and thinners. The fillers may be particulate (including microspheres or microballoons) or fibrous or a mixture of particulate and fibrous. One class of particularly preferred dilatants based on PBDMS comprises the borated silicone-based materials that are marketed under the generic name of silicone bouncing putties and are produced by various manufacturers. These include those by Dow Corning under product catalogue no. 3179; by Wacker GmbH under product numbers M48 and M29 and by The Polish Chemical Institute under the product name Polastosil AMB-12. Other companies such as Rhodia, GE Plastics, ICI have also produced these materials, and other polymer-based dilatant materials having similar dilatancy characteristics, e.g. a similar modulus at low rates of strain and a similar plot of modulus with respect to the applied strain rate.

It is believed to be the presence of the borated cross-link within the composite material which enables it to exhibit a resistive load under deformation which increases with the rate of deformation. This type of cross-link is considered temporary because it is believed to form reversibly and only or mainly during high rates of deformation of the polymer. In the PBDMS polymer this effect inhibits the siloxane chains from sliding during high rates of strain thus instantaneously inhibiting viscous flow. In this condition the polymer will therefore behave more like an elastomer. The composite material of the invention also possesses the borated cross-links which enable it to exhibit the aforementioned behaviour. Other polymers that exhibit a temporary cross-link in the manner of PBDMS may also be used.

The composite material of this invention is preferably comminuted for ease of handling; for example, in transportation or for moulding purposes.

In accordance with another aspect of this invention, there is provided a process for the preparation of a composite material according to the hereindescribed invention which process comprises:

a) melting the polymer intended to comprise the first material i); and b) blending the polymeric dilatant intended to comprise the second material ii) therewith.

The polymer intended to comprise the first material i) is as hereinabove defined and/or the polymeric dilatant intended to comprise the second material ii) is as hereinabove defined.

Preferably, the polymeric dilatant is melted prior to and/or during the blending step (b). Suitably, after blending and cooling, the composite material so formed is c) comminuted.

One preferred method of forming the blend is first to form microspheres of second material ii) coated, for example with a polymer such as an elastomer, to prevent coalescence. These coated microspheres are then introduced into the first material i) which is either comminuted or in the melt.

This invention further provides a composite material prepared by a hereindescribed process of this invention.

In accordance with an important aspect of this invention, there is provided a composite material prepared by a hereindescribed process of this invention which has subsequently been foamed; suitably, the so-produced foam is a closed cell foam. Suitably, at least part of the polymeric dilatant ii) is included within cell walls of the foam.

It is preferred that the cells include, as pneumatogen, a gas, vapour, supercritical liquid, or a precursor thereof; for example, nitrogen or carbon dioxide. Usually, the gas or vapour will be substantially uniformly dispersed throughout the matrix but non-uniform dispersion may be desirable in certain cases. The contribution of the gas or vapour to the resilient compressibility may be due to redistribution of gas or vapour within the matrix or compression of the gas or vapour (or, indeed, both of these effects). The presence of the gas or vapour within the composite material not only significantly reduces the overall density of the composite but can also provide an amount of damping within the system due to pumping losses associated with a pneumatic effect. The compressive resilience will also be enhanced by a pneumatic effect which will increase with the ratio of closed to open cells in the foam. An amount of pneumatic damping is desirable when considering energy absorption during impact and will further enhance the reactive nature of the composite.

An important property of the foam is the rate at which it recovers after being subjected to deformation, especially compression. Preferably, recovery is complete or substantially complete within a few seconds, e.g. 5 seconds or less, more preferably 2 seconds or less. In certain applications however a slower rate of recovery may be desirable.

The foamed composite material of the invention may be prepared by combining the polymer intended to comprise the first material i); the polymeric dilatant intended to comprise the second material ii); and the gas, vapour, supercritical liquid, or precursor thereof, such that the dilatant and the gas or vapour are distributed, generally substantially uniformly, throughout the matrix to produce a resiliently compressible material which exhibits a resistive load under deformation which increases with the rate of deformation. Whatever process is used, however, while the dilatant may be incorporated into the structure of the foam it is important that it does not completely displace the gas or vapour from the pores.

One such process comprises incorporating an unfoamed composite material, or a mixture of i) and ii), according to the hereindescribed invention in the barrel of an injection moulding machine including means for supplying a pneumatogen thereinto; bringing the material so defined to an elevated temperature and an elevated pressure such that it is in molten form; supplying a pneumatogen to the barrel; and reducing the pressure of the heated composite material thereby causing foaming of the composite material.

The pressure may be reduced in this process by injecting the composite material into a mould or extruding the composite material, suitably at ambient pressure. Such a process may be operated on a continuous basis.

Preferably the weight ratio of ii) to i) is from 4 to 0.25, most preferably from 2.3 to 1. Preferably the elevated temperature is from 150° C. to 240° C., most preferably from 170° C. to 210° C. Preferably the elevated pressure at which the pneumatogen is injected is from 1600 psi to 2000 psi, most preferably from 1700 psi to 1900 psi.

Another such process comprises incorporating an unfoamed composite material, or a mixture of i) and ii), according to the hereindescribed invention into a hermetic container including means for supplying a pneumatogen thereinto; bringing the composite material to an elevated temperature at an elevated pressure; and injecting pneumatogen into the hermetic container. Suitably, the interior of the container is formed as a mould.

Preferably the weight ratio of ii) to i) is from 4 to 0.25, most preferably from 2.3 to 1. Preferably the elevated temperature is from 150° C. to 240° C., most preferably from 170° C. to 200° C. Preferably the elevated pressure is from 8000 psi to 12000 psi, most preferably from 9000 psi to 11000 psi.

In such a process, the polymer intended to comprise the first material i) and the polymer-based dilatant intended to comprise the second material ii) are combined to form an intimate admixture, and the resultant mix is then foamed to form the composite. The methods employed can be selected from a number of recognized industrial processes such as the various chemical or physical blowing methods. An additional preparatory process using a very high pressure nitrogen environment is also possible. This process uses a solid extruded section of the blend which is cross-linked (chemically or by irradiation) then subjected to a temperature and pressure cycle in an autoclave which is charged with nitrogen. The temperature will soften the material to aid solubility of the gas, which is at very high pressure (10,000 psi). This process may take several hours depending on the material and the thickness used. After this first autoclave process the resulting material has tiny bubbles of trapped nitrogen at very high pressure. A secondary lower pressure/temperature cycle then allows the trapped nitrogen to expand the surrounding material to form a foam. The exact pressure and temperature cycle of this second process will determine the final density of the foam produced. This process is used by Zotefoams, Croydon, UK.

Another such process comprises incorporating with an unfoamed composite material, or with one or both components of a mixture of i) and ii), as hereinbefore defined microspheres comprising a plastic shell which hermetically encapsulates a gas or vapour; bringing the material so defined to an elevated temperature and pressure; and reducing the pressure of the heated composite material thereby causing the expansion of the microspheres and foaming of the composite material. The pressure may be reduced in this process by injecting the composite material into a mould or extruding the composite material, suitably at ambient pressure. Such a process may be operated on a continuous basis.

In such a process according to the invention the foamed composite material of the invention may be prepared using, as pneumatogen, microspheres comprising a polymeric shell which hermetically encapsulates a gas (EXPANCEL by Akzo Nobel, for example). The microspheres may be mixed with the first material i) or coated with the second material ii) (or, indeed, both) before blending i) and ii). On heating the produced blend, the gas in the microspheres expands (the expansion may be ca 40×) to create closed cells.

Preferably the weight ratio of ii) to i) is from 4 to 0.25, most preferably from 2.3 to 1. Preferably the elevated temperature is from 160° C. to 230° C., most preferably from 190° C. to 210° C. Preferably the elevated pressure is from 5000 psi to 8000 psi, most preferably from 6000 psi to 7000 psi, the autogenous pressure generated in an injection moulding machine or extruder.

The composite material of the invention may include components other than the polymer intended to comprise the first material i), the polymer-based dilatant intended to comprise the second material ii) and the gas or vapour; e.g., fibrous and/or particulate fillers, plasticisers, lubricants, extenders, pigments and dyes. If desired, the composite of the invention may be incorporated within an envelope which may be rigid or flexible, but it is valuable feature of the invention that such containment is not essential.

Likewise, it may be associated with a rigid or semi rigid component but this is not essential for the use of the composite and may even compromise some of its properties for certain applications.

Furthermore, it may also be associated with a textile layer or similar where the textile has the facility to enhance the abrasion performance and in some cases the resistance to intrusion from sharp objects and/or assist in the attachment of the composite material to other systems or products. A stretchable textile backing will also serve to limit the elongation of the material and thereby provide durability. The textile may also serve as an antiballistic or stab-proof fabric such as certain woven grades of KEVLAR.

In accordance with a further aspect of this invention, the final properties of the composite material as hereindescribed, such as resilience, strain rate sensitivity, tensile strength, hardness, elastic modulus, and creep modulus, may be carefully controlled by the use of compatibilisers or crosslinking (or indeed both). Crosslinking may be chemical crosslinking or physical crosslinking (such as by irradiating or by entanglement polymerisation) and may be undertaken on first material i) or the second material ii) (or, indeed, both). The first material i) may be crosslinked to the second material ii).

In general, the composite material of the invention will exhibit resistance to creep and compression set. A low creep modulus of the composite modulus will be beneficial, but not essential, to imparting resistance to compression set. In some applications it may be preferred to allow the material to have high creep characteristics; for example, for sound insulation purposes.

The actual constitution of the composite material of the invention will be influenced by the intended application. Applications cover a wide range of uses and include impact protection for objects, animals and humans. Potential applications extend to any dynamic situation where the object may already be in contact with a surface and the combination of object and surface may undergo severe acceleration and/or deceleration, e.g. as in packaging for delicate equipment or a human body in a vehicle seat. Thus, the nature of the composite material and the choice and blending ratio of the dilatant in the composite material and, where foamed, the amount of gas or vapour in the composite material, e.g. as indicated by the required density of the composite material, will be determined by the requirements of the protective system in which the composite material is to be employed. In general, the dilatant will form from 5 to 80%, preferably 10 to 50%, more preferably 15 to 40% by volume of the composite, and where foamed, the amount of gas or vapour (in the preferred case where it is a gas) will be such that the gas or vapour content of the composite is preferably from 20 to 90%, more preferably from 30 to 80%, still more preferably from 40 to 70% by volume. It should be noted that these proportions are excluding the use of any fillers or other additional components.

Still further according to the invention there are provided shaped articles, e.g. extruded articles such as films, sheets, filaments and fibres, comprising the composite materials of the invention. Shaped articles such as textured sheets of the composite may have the texture geometrically configured such that compressive deformation will advantageously deform the elements comprising the texture to optimise the reactive nature of the composite. This is particularly beneficial in closed cell foam. The shaped article may, if desired, be produced in such a way as to include regions or layers in which the ratio of dilatant within the composite material differs from that in other regions or layers. In this way the distortion of the shaped article, e.g. fibre or filament, may be configured to facilitate maximum shear deformation shearing of the dilatant rich regions at the dilatant/matrix interface.

The fibres or filaments may be woven, knitted or otherwise configured such as to incorporate air into the final product. When such a material is subjected to impact, the distortion of each fibre is facilitated by the air spaces to provide a large number of localised bending deflections, which is preferable for the efficient use of the composite material in absorbing impact.

The choice and concentration of the first material i) is preferably such as to allow the shaping of the composite material e.g. into fibres or filaments. In low strain rate movements, the flexibility of a textile comprising fibres or filaments formed from the admixture composite blend may be provided by choice of fibre weave or knit Other fibres or filaments may be included in the textile, if desired, e.g., elastic fibres and/or abrasion-resistant fibres.

The fibre which may be formed, for example, by extrusion or spinning may have an even distribution of second material ii) within first material 1) or may be manufactured to create regions or layers where the second material ii) is more concentrated.

In accordance with a still further aspect of this invention, there is provided a fibre which comprises a core of second material ii) within a sheath of first material i), wherein the first material i) and second material ii) are as hereindefined. The core may be hollow, preferably coaxially hollow. Such fibres may be made by coextrusion. Such a fibre is depicted in FIG. 1 of the accompanying drawings in which 1 is a core of second material ii), 2 is a sheath of first material i) and 3 is a hollow containing a gas (air).

The energy absorbing composite material of the invention may be employed in a wide variety of applications; for example in protective pads or clothing for humans and animals, in or as energy absorbing zones in vehicles and other objects with which humans or animals may come into violent contact, and in or as packaging for delicate objects or machinery. Specific examples of applications are in headwear and helmets; protective clothing or padding for elbows, knees, hips and shins; general body protection, for example for use in environments where flying or falling objects are a hazard; vehicle dashboards, upholstery and seating. Other potential uses are in garments or padding to protect parts of the body used to strike an object e.g. in a sport or pastime; for example in footwear, such as running shoe soles, football boots, boxing gloves and gloves used in the playing of fives. The energy absorbing composite material of the invention may also be employed in non-impact situations; for example, in energy absorbing and damping materials such as automotive mounts, vibration isolation and sound insulation. This list is not intended to be exclusive and other potential uses will occur to the reader.

Figure 2:
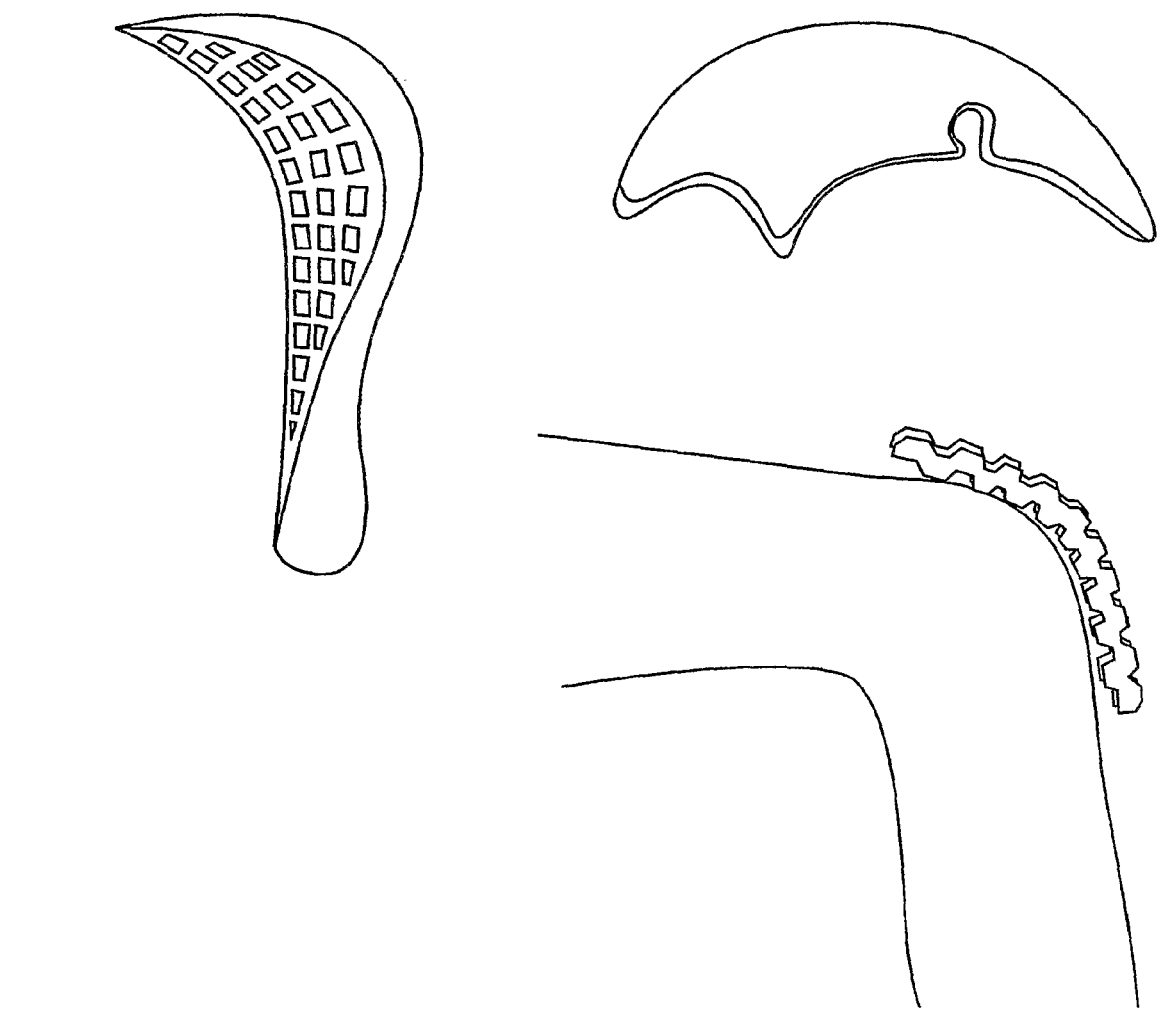
FIG. 2 shows an example of the composites as disclosed herein shaped as a knee or elbow pad.
Figure 3:
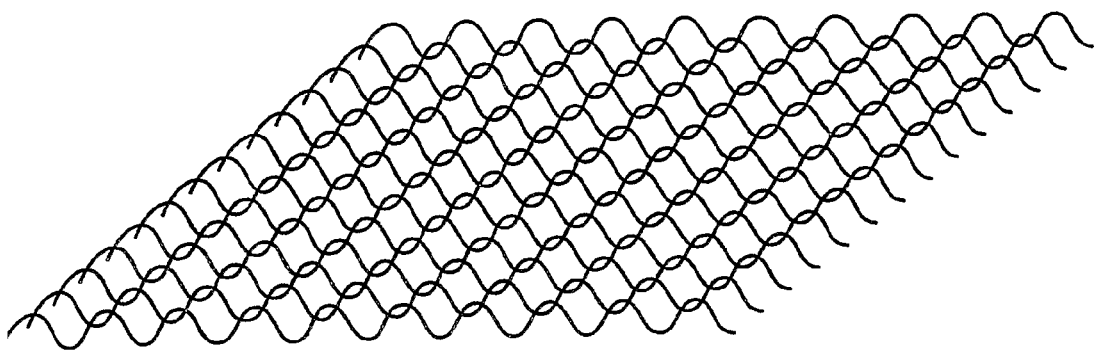
FIGS. 3 and 4 each show shaped articles of the composites as disclosed herein.
Figure 4:
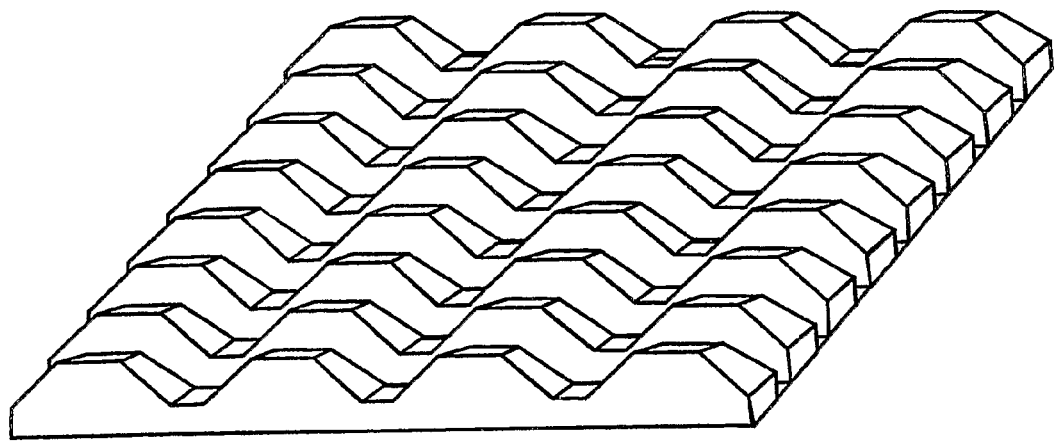
Figure 5:
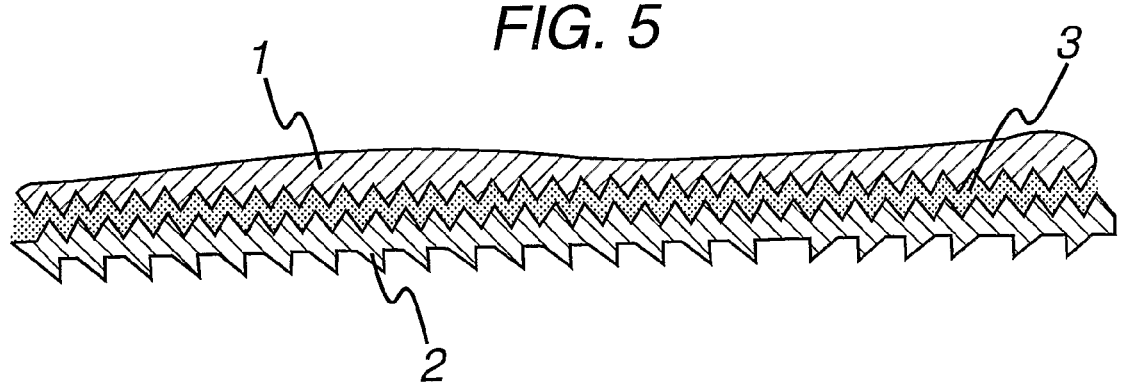
FIG. 5 shows the composite material in a construction of a sole in footwear, wherein the composite material is between the innersole (1) and outersole (2), where the interfaces between both the innersole and midsole (3) and the outersole and midsole are contoured or textured to induce large amounts of shear deformation in the composite material as disclosed herein.
Figure 10:
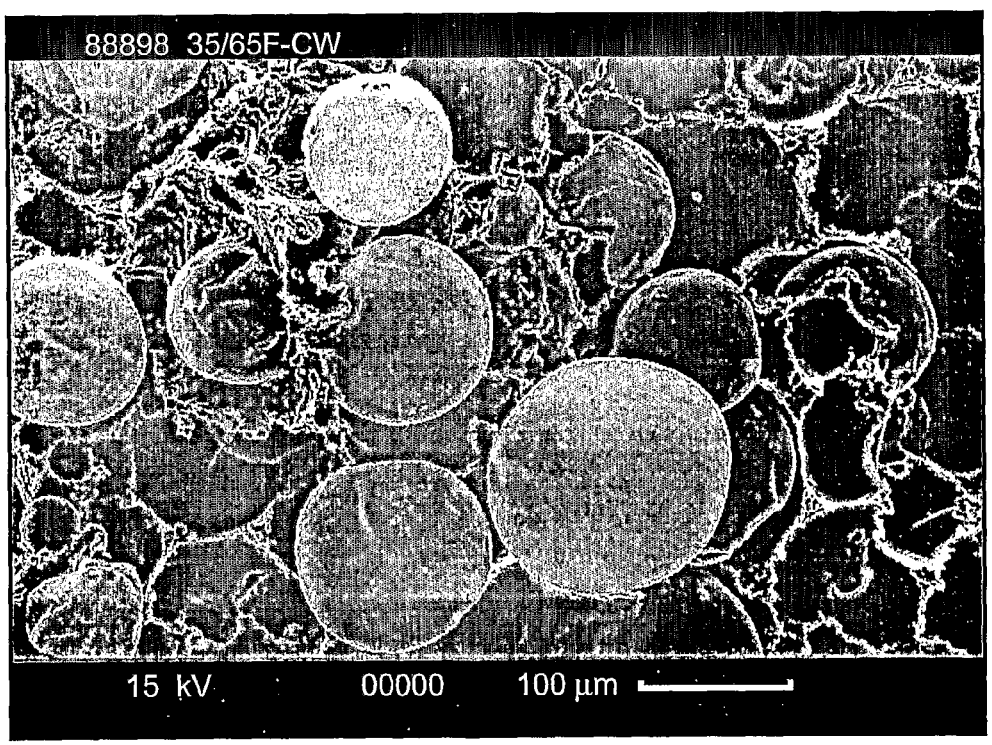
FIGS. 10 and 11 each show photomicrographs of a 35/65 and 50/50 blend further processed to produce a closed cell foam, as prepared in Example 3, where
Figure 11:
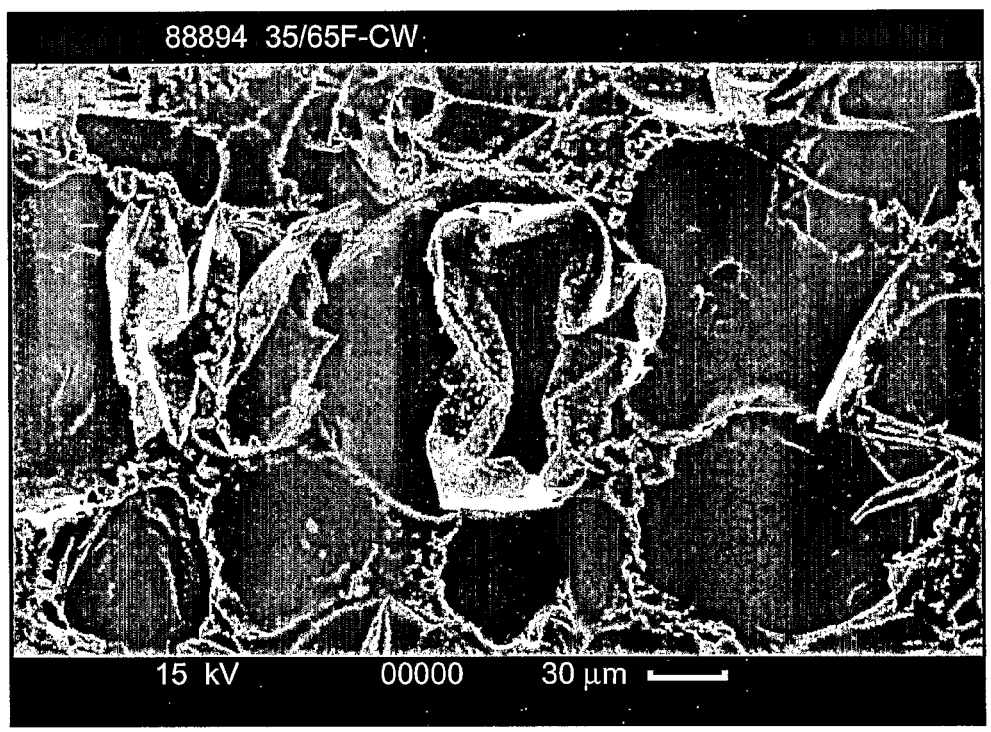
Figure 12:
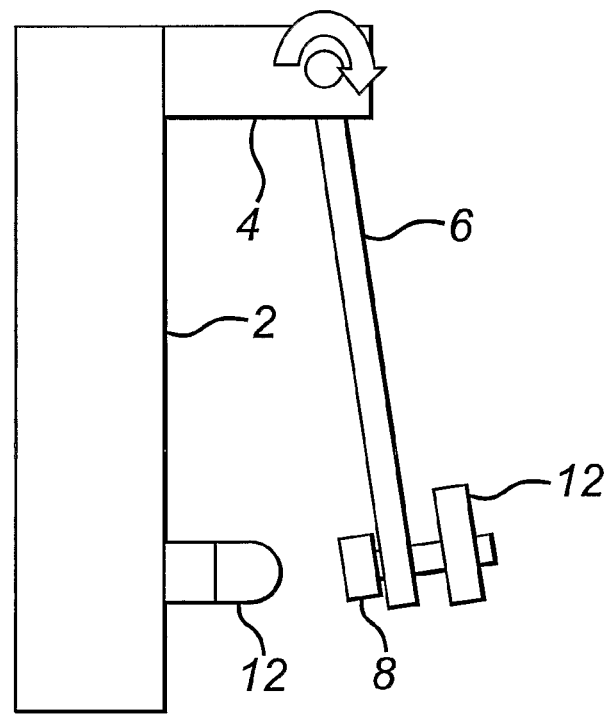
FIG. 12 shows an illustration of the pendulum impact rig used in Example 4 to assess the effect of the dilatants material on impact properties of the composites.
Figure 13:
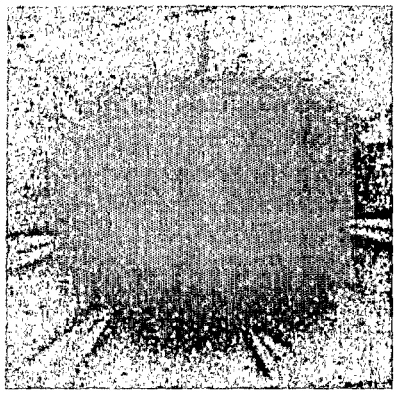
FIG. 13 shows photographs of the performance of the materials with respect to pressure for a 50J impact, as noted in Example 4.
Figure 13:
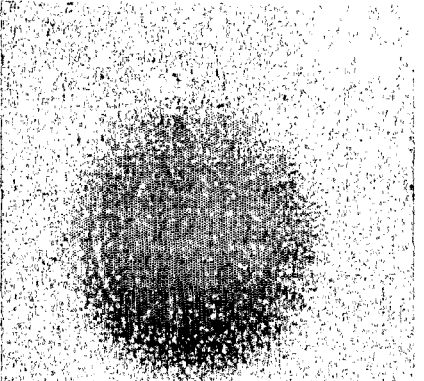
Figure 13:
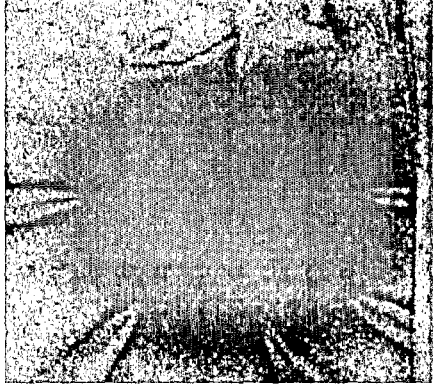
Figure 13:
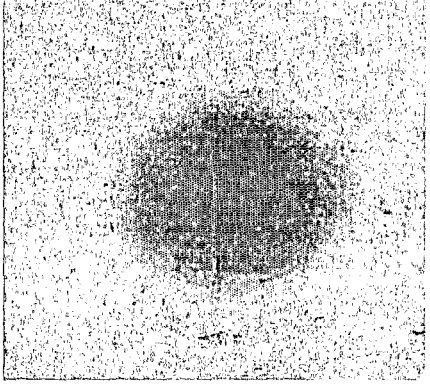
Figure 13:
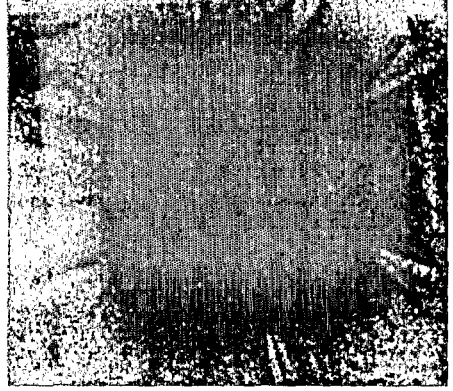
Figure 13:
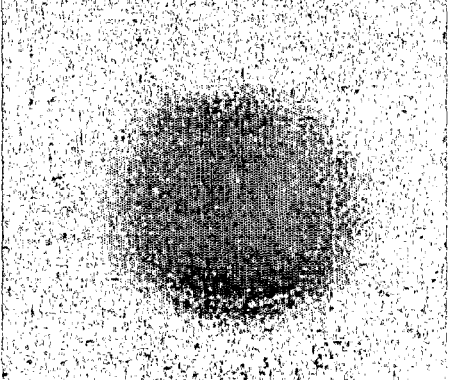

Examples are depicted in FIGS. 2 to 4 inclusive of the accompanying drawings. FIG. 5 of the accompanying drawings illustrates an example of use in footwear. FIGS. 6 to 9 represent photomicrographs discussed in more detail in Example 2. FIGS. 10 and 11 represent photomicrographs discussed in more detail in Example 3. FIG. 12 represents diagrammatically the impact rig used in Example 4; and FIG. 13 depicts the results of Example 4.

In order to provide favourable pressure characteristics and a greater level of support under shock loads transmitted through the sole of the foot during any type of active recreation, the composite material is utilised in the construction in the soles of footwear, e.g. innersoles, midsoles or outer soles. The example illustrates the use of the material between the innersole (1) and the outersole (2), where the interfaces between both the innersole and midsole (3) and the outersole and midsole are favourably contoured or textured to induce large amounts of shear deformation in the foamed composite material of the invention. This type of construction may be formed by incorporating the foamed composite material into the cavity between the inner and outer sole such that the resulting midsole solidifies and bonds to both the inner and outer sole. A similar structure is achieved as a one-part moulding whereby the material foams within a mould, the inner and outer soles being formed by the "skin" produced at the mould surfaces.

A coating may be applied to the composite if desired.

The following Examples illustrate the invention.

EXAMPLE 1

The elastic polymeric constituent material selected for a precursor blend process evaluation was a linear low density polyethylene (Flexirene MR50 by Europa Polymeri). Three dilatant materials were selected for blending trials in different ratios. The three dilatant materials were the Dow Corning silicone dilatant 3179, Polastosil AMB-12 and pure PBDMS. These were blended with the LLDPE MR50 using a Shaws K1 3 litre intermix. The LLDPE was introduced into the mill in granular form first where the temperature generated through shearing the material rose to around 110° C. The dilatant materials were then fluxed into the internal mixer in the ratios as specified below:
1. 35% 3179 65% LLDPE by weight.
2. 50% 3179 50% LLDPE by weight.
3. 50% Polastosil ABM-12 50% LLDPE by weight.
4. 35% Polastosil ABM-12 65% LLDPE by weight.
5. 30% PBDMS 70% LLDPE by weight.
6. 35% PBDMS 65% LLDPE by weight.

The above material blends were then dump extruded through 4×2 mm diameter dies to form strands which were then pelletised.

EXAMPLE 2

Having demonstrated the method of blending the dilatant and a thermoplastic polymer using standard industrial equipment in Example 1, Example 2 extends the processing route through the realization of a closed cell structure.

One process found suitable for closed cell foam manufacture is a high-pressure gas solution process. This process subjects a block of solid polymer material to very high pressure in a gas (for example, nitrogen) filled autoclave at a controlled temperature to force the gas into the solid polymer. This block is then foamed under controlled high pressure and temperature, again using a gas filled autoclave. The advantage of the process for foam manufacture is the uniformity of the cellular structure and the lack of chemical deposition from conventional blowing agents.

In order to confirm that such a manufacturing process is suitable it is necessary to demonstrate that the mixture will be stable at the elevated temperatures of the manufacturing process. This is necessary in order to consider replacing the polymer sheet or block in the experimental process with a prepared sample containing both the dilatant and the matrix material, as an intimate mix. The normal operating temperature of the process is around 165° C.

The polymer-based elastic matrix material chosen for an initial trial was Hytrel G3548L, which is a polyester based thermoplastic elastomer available from Du Pont. 50 grams of Hytrel and an equal weight of 3179 dilatant compound (see Example 1) were placed in a crucible in preparation of mixing at high temperature. A laboratory oven was preheated to 220° C. and the crucible and contents placed in the oven and left for 30 minutes. The crucible was then removed and the contents stirred with a metal spatula to mix the two materials. The resulting mixture was next replaced in the oven and heat soaked for a further hour at this temperature, before removing for investigation. The two materials mixed very well to produce an admixture that was solid at room temperature. The admixture was heated to 165° C. in a laboratory oven and was found to be stable over a period of 8 hours, which is the duration of the high-pressure nitrogen gas solution process. The results indicate the potential suitability of the sample for foaming using a high-pressure gas (such as nitrogen) process or indeed other physical or chemical blowing processes.

Having established the ability of the two materials to form an intimate admixture, the process was scaled to produce 30 kg batches on industrial equipment using the method as described in Example 1.

Hytrel grade G3548L was blended with Dow Corning Silicon dilatant 3179 to produce a precursor material. The two blend ratios chosen were 35/65 dilatant to Hytrel by weight and 50/50 by weight, the blending process yielded around 30 kg of each blend ratio.

As subsequent processing of these blends to produce closed cell foams via physical or chemical blowing techniques requires the material to be returned to the molten state a study of the effect of this on the structure of the material was undertaken.

The blend materials (now in pellet form) were put onto non-stick vessels and subjected to a temperature of about 200° C. The pellets were left for one hour, after which time the material was molten; stirred; then left for an additional hour before removal from the oven. On cooling the mixes solidified.

The solid shapes were then examined under a scanning electron microscope (SEM). To expose the structure of the material two techniques were employed-cutting with a razor blade and fracturing the samples by immersing them in liquid nitrogen and fracturing them at a notch (cut by a razor blade).

Figure 6:
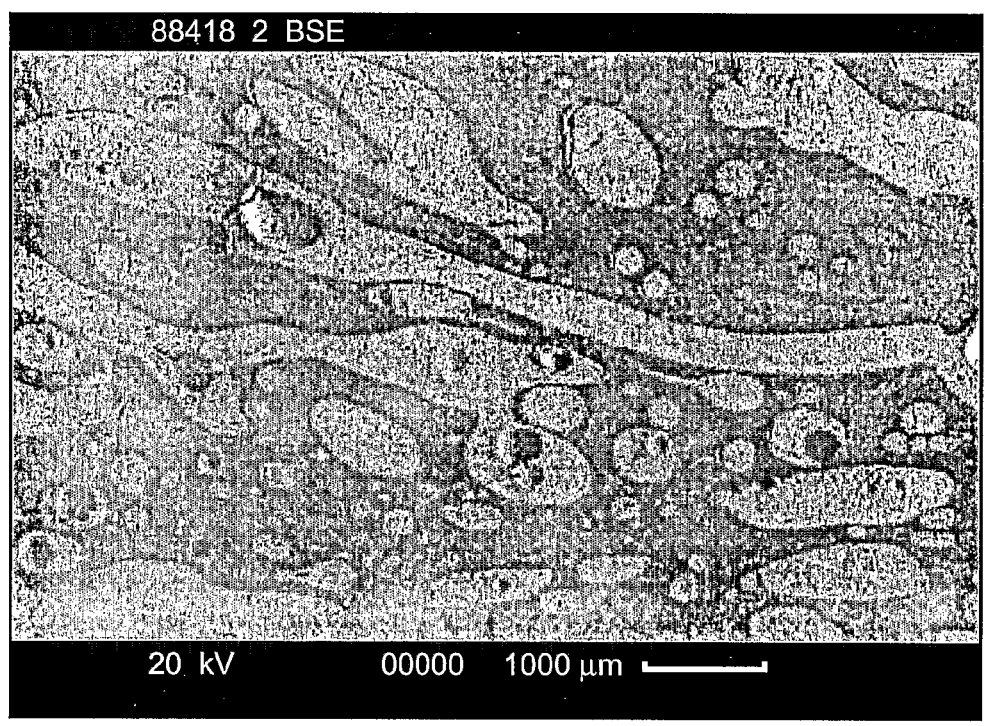
FIG. 6 shows a photomicrograph of the structure of a 50/50 blend at 25× magnification, as prepared in Example 2, based upon a cut surface.
Figure 7:
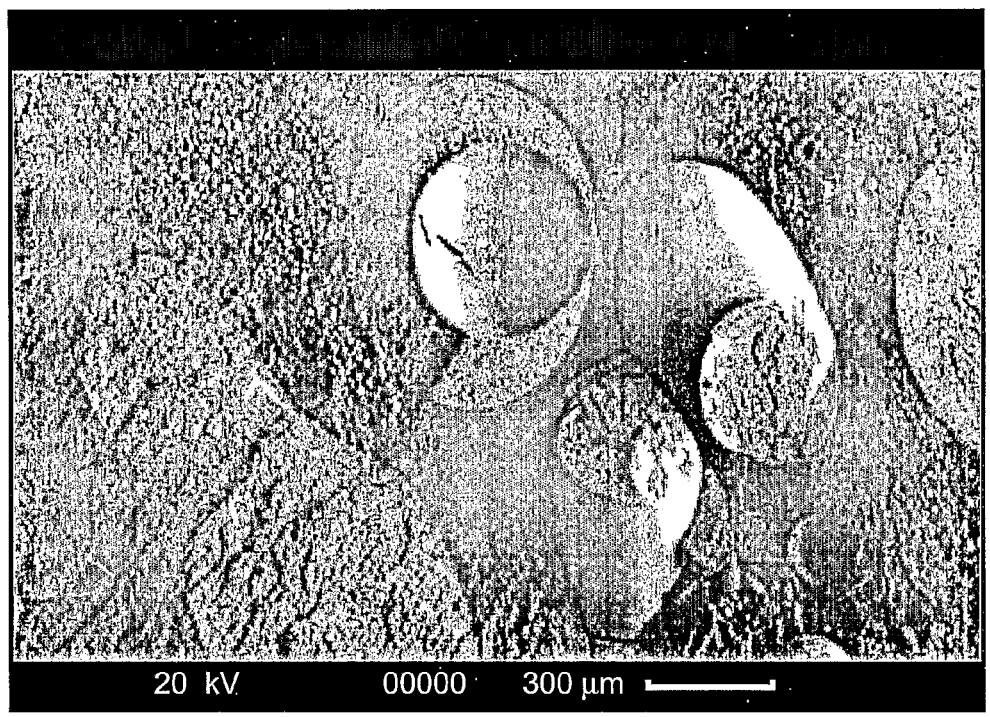
FIG. 7 shows a photomicrograph of the structure of a 50/50 blend at 83× magnification, as prepared in Example 2, based upon a fractured surface.
Figure 8:
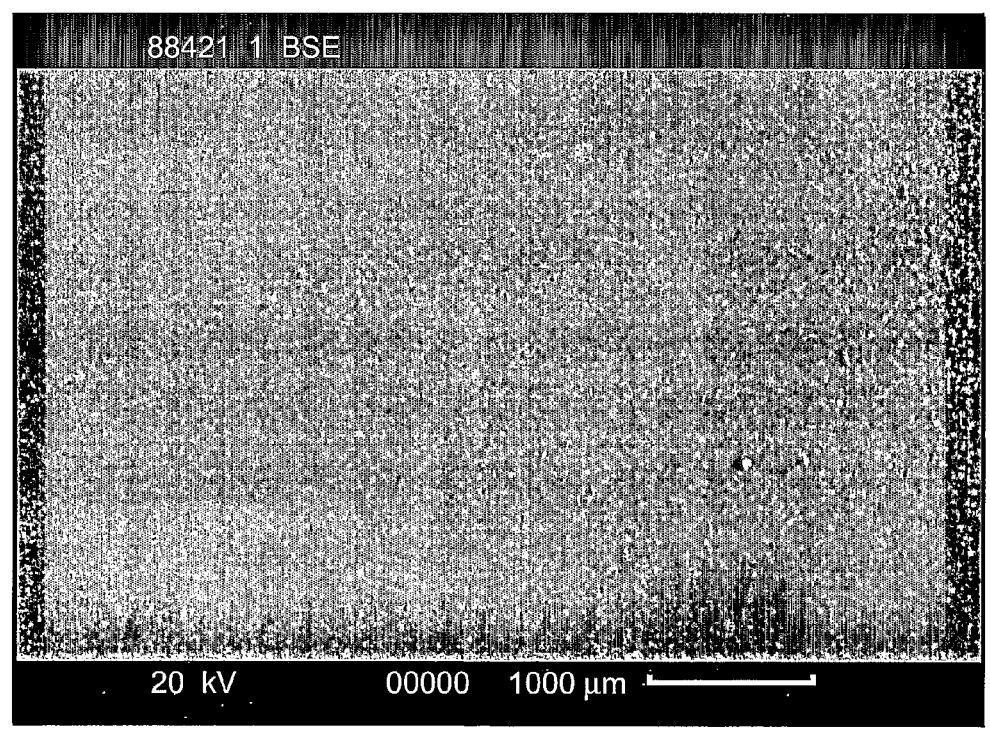
FIG. 8 shows a photomicrograph of the structure of a 35/65 blend at 33× magnification, as prepared in Example 2, based upon a cut surface.
Figure 9:
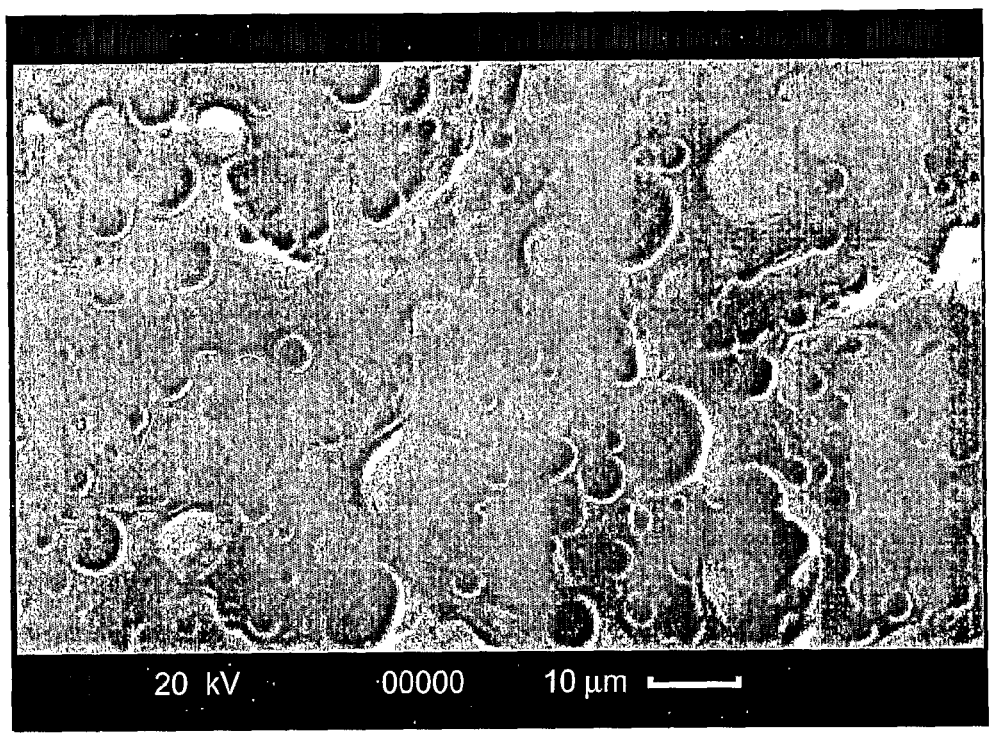
FIG. 9 shows a photomicrograph of the structure of a 35/65 blend at 1200× magnification, as prepared in Example 2, based upon a fractured surface.

The photomicrographs in FIGS. 6, 7, 8 and 9 represent, respectfully, the structure of a 50/50 blend at 25× magnification; the structure of a 50/50 blend at 83× magnification; the structure of a 35/65 blend at 33× magnification; and the structure of a 35/65 blend at 1200× magnification. FIGS. 6 and 8 were obtained from cut surfaces while FIGS. 7 and 9 were obtained from fractured surfaces.

In addition to the photomicrographs an electron probe analysis was undertaken to establish the chemical make-up of the phases observed.

The light areas shown in the photomicrographs are those of higher density material (the specific gravities of Hytrel G3548L and DC3179 are 1.15 and 1.14. However, the electron probe analysis shows a higher silicon content in the lighter regions and these are, therefore, assumed to be more chemically similar to the DC3179 dilatant than the Hytrel. Some silicon was also detected in the darker regions (assumed to be mainly made up of the Hytrel) and, under further investigation, these included a very fine dispersion of silicon based particles. These particles were originally a constituent of the dilatant in the form of crystalline silica (quartz) and so the original blend must have been a very intimate mixture of the dilatant and the Hytrel polyether ester copolymer.

The phase separation is almost certainly due to the subsequent melting of the blend the higher the dilatant content the more separation is occurring i.e. the regions of higher density (dilatant) material in the 50/50 blend are much larger and vary in size and shape compared to that of the 35/65 blend. Both the cut and fractured sections (FIGS. 1 and 2) indicate poor adhesion between the two phases due to the presence of fissures at the interfaces between the phases.

The phases present in the 35/65 blend are considerably finer (see FIG. 8). The second non-continuous phase is in the form of spherical particles which are typically 3 to 10 μm in diameter (FIG. 9). The fracture has occurred across a plane which follows the interface between the two phases which again indicates poor adhesion between the phases.

From the analysis it can be concluded that the blend materials before subsequent heating to the molten state were a very intimate dispersion of one phase in the other. This being indicated by the presence of crystalline silica in the Hytrel phase of the blend. The separation of the phases evident in the 50/50 blend is due to the subsequent heating process. The amount of separation for the 35/65 blend having had the same heat treatment is considerably less and therefore phase separation appears to be dependent on the ratio of dilatant to Hytrel- the higher the dilatant content the greater the separation.

If a finer dispersion of dilatant within a second material has advantages over a larger two phase structure consideration of the blend ratio and processing time in the molten state should be given. This is also the case if a structure such as that seen in the 50/50 blend offers advantages. The inference of this study is that the structure of the phases can be controlled by the blend ratios and heat treatments.

EXAMPLE 3

The two batches of blend materials (the 35/65 and the 50/50 blend) were further processed to produce a closed cell foam using the Expancel process. The particular grade of Expancel used was Akzo Nobel Expancel 092MB 120 which was masterbatched with the same Hytrel grade to give a high concentration of Expancel in the masterbatch. The masterbatch was then mixed with the two blends to give a final percentage by weight of 8% of Expancel to the blend.

The blends, as well as pure Hytrel with the same content of Expancel were then sheet extruded. This was done by using a heated screw feeder fed by a hopper containing the material in pellet form. As the pellets of material are screw fed down the barrel of the machine the heaters raise the temperature of the pellets to around 200° C. which takes the material into the molten state. This temperature also activates the Expancel but the pressure in the barrel stops the material from forming cells at this stage. The molten material was then injected through an orifice around 4 mm wide by 180 mm long onto non-stick polished steel rollers. As the molten material flowed onto the rotating rollers to drop in pressure to atmospheric enabled the material to foam under the action of the Expancel system. The material was fed through another two rollers to produce a solid foamed material around 6 mm thick with a density of around 380 kg/m$^3$. The final density and thickness are influenced by the relationship between the speed of the screw feeder and the rotational speed of the rollers. All three materials- the pure Hytrel, the 35/65 blend and the 50/50 blend felt relatively stiff.

As the dilatant material is soft and flowable it was expected that the presence of this in the blends should have imparted some softness to the final foamed blend when compared to the foamed Hytrel material.

It was unexpectedly noticed, however, that during subsequent repeated compression of the material that all of the foamed materials became softer. By undertaking a controlled amount of repeated compression on all materials the foams were "worked" into their softest state. This was done by passing the material through contra rotating steel rollers spaced at around 3 mm. This was done slowly, the rollers being turned by hand, and repeated 20 times for each material. Softness measurements were made before and after this process using a hand held ASTM D2240 durometer to give a "Shore A" reading for the materials. These are shown in Table 1.

TABLE 1

| | HYTREL FOAM | | 35/65 BLEND FOAM | | 50/50 BLEND FOAM | |
|---|---|---|---|---|---|---|
| | As extruded | Softened | As extruded | Softened | As extruded | Softened |
| Shore a hardness | 52 | 33 | 52 | 27 | 52 | 25 |

An explanation as to why the materials became softer after repeated compression is given by observing the structures before and after this softening process with the aid of SEM. It could be seen that it was the Expancel which was reinforcing the blend material. The Expancel manifests as discrete, relatively rigid, microballoons (FIG. 10: the internal structure was exposed by tearing the sample). The Expancel microballoons can be clearly seen intact. FIG. 11 shows the structure subsequent to softening process. The Expancel microballoons have collapsed to provide no cell reinforcement and so allowing the matrix material to define the softness of the foam. This change in structure was observed for all three materials.

This charge in softness according to the amount of repeated compression of the material may provide benefits for in service use of such a material e.g. for insoles where the high pressure areas under feet will yield to allow the insole to "mould" to the shape of the underside of the foot. The same principle can be applied to ski boot liners.

EXAMPLE 4

In order to assess the effect the dilatant material has on the impact properties of the Hytrel impact tests were performed.

These tests were performed on a specially designed pendulum impact rig which is illustrated in FIG. 12, and essential features of which are listed in Table 2 below. Briefly, the apparatus comprises a gallows-shaped rigid support 2 on the end of the horizontal arm 4 of which is freely pivotally mounted a swing arm 6 which is pivoted to swing in a vertical plane. On the free end of the swing arm is mounted an impact head 8 to which weights 10 may be attached. Located on the vertical arm of the rigid support at a position such that a sample (not shown) mounted on it will be struck by the impact head, is a hemispherical steel anvil 12.

TABLE 2

| | |
|---|---|
| Mass of swing arm assembly | 4.055-9.247 Kg |
| Radius of Swing arm [From fulcrum centre to impact head centerline] | 1.248 m |

TABLE 2-continued

| | |
|---|---|
| Radius of swing arm mass centre [From fulcrum to centre of gravity of swing arm] | 0.852-1.05 m |
| Swing arm material | Aluminium extrusion and steel [bolted assembly] |
| Anvil diameter | 0.1 m |
| Anvil material | Steel [welded assembly] |
| Impact head dimensions | 40 mm × 80 mm |
| Mass of Impact head | 0.25 Kg |
| Material of Impact head | Steel |
| Material of additional weight | Steel |
| Rigid support material | Steel [welded assembly] |

Impact rigs are most commonly either of a drop weight design or of a swing pendulum design. In this case the swing pendulum design was chosen as it offers certain advantages for the purpose of development testing. The applied impact load for a pendulum rig is not followed by a residual creep load, as is the case for a drop weight design, where the impact head remains in contact with the tested sample after the impact event. This is particularly relevant in respect of impact testing where the use of pressure measuring devices are employed such as pressure sensitive film. These record peak pressure during the impact and any secondary strike or residual load may corrupt these readings.

In any impact test the applied impact energy is equal to the net kinetic energy of the impact head immediately prior to impact, and in the case of a pendulum rig this is a function of the impact head speed and the rotational mass of the system. The impact rig was thus designed such that it was capable of applying a range of impact speeds, by adjusting the inclined angle of the pendulum prior to release and a range of rotational mass, through the addition and subtraction of weights near the impact head. The geometry of the impact head and anvil were chosen to replicate the EN 1621-1 1997 standard test for motorcycle body protection.

The test procedure was to apply the material samples to the anvil in the orientation and position best representing the material's use on the body as body protection, and to fix this to the anvil with the use of adhesive tape. The impact swing arm was then retracted to a prescribed angle before release. During the impact event the force transmitted was measured dynamically with a calibrated piezo-electric load cell and the peak force recorded. This load cell is located behind the hemi-spherical dome of the anvil. Preload of the piezo-electric load cell was used according to best practice and reset to read zero.

Additionally the pressure transmitted to the anvil during the impact was also recorded on Fuji pressure film attached directly to the anvil and affixed with masking tape at its edge. In order to simultaneously measure the pressure transmitted at the different pressure ranges, medium (1400-7000 psi), low (350-1400 psi) and super low (70-350 psi) films were placed on top of one another in a stack and affixed to the rig simultaneously. All samples of film were pre cut to size and measured 5 cm wide and 5.5 cm high. They were placed on the anvil in a portrait orientation, with the masking tape applied at the top and bottom only. Fuji pressure film serves as a simple but effective way of indicating the peak pressure during the impact over the contact area under investigation.

The standard EN 1621-1 test is not representative of real impact events to the human body as the anvil is part of an extremely rigid system and does not offer any compliance in the manner of the body. The criterion for passing the EN1621-1 test for motorcycle protection is that the peak load transmitted is less than 35 kN for the impact speed of 4.3 m/s and an impact energy of 50J. However, a peak-transmitted force of 35 kN if actually applied to the body would cause severe injury.

It is for these reasons that in addition to the specified speed and energy level an impact speed of 3.9 m/s and energy value of 20J was also used. With the additional use of Fuji pressure film, it is also relevant to define more fully the performance of a material for which one of the proposed uses is body protection systems used for a variety of sports e.g. snow sports, skateboarding and downhill mountain biking.

To obtain the two energy levels additional mass was used for the higher 50J impact. This was added behind the striker so in order to calculate the angle from which to release the arm the new centre of mass was determined by measurement. This is shown in Table 3.

TABLE 3

| Energy of Impact (J) | Angle of pendulum [deg] from horizontal | Impact speed m/s | Swing Arm mass (kg) | Centre of Mass Radius (m) |
|---|---|---|---|---|
| 20 | 22 | 3.9 | 4.055 | 0.805 |
| 50 | 14.5 | 4.3 | 6.90 | 0.986 |

All three materials were tested as described above using two layers of the extruded sheet material the force results in both the as extruded and softened condition for the two impact energy levels are shown below in Table 4.

TABLE 4

| PROPERTY | | HYTREL | | 35/65 Blend | | 50/50 Blend | |
|---|---|---|---|---|---|---|---|
| Softness - shore a hardness | | Hard 52 | Soft 33 | Hard 52 | Soft 27 | Hard 52 | Soft 25 |
| Force Impact (kN) | 20 J | 7 | 9.6 | 4.9 | 9.1 | 6.7 | 8.7 |
| | 50 J | 18.6 | 19.1 | 15.9 | 16.1 | 16.9 | 16.6 |
| Density | S.G. | 0.4 | | 0.4 | | 0.4 | |
| Thickness | Mm | 11 | | 10 | | 10 | |

The performance of the materials with respect to pressure for the 50J impact are shown in FIG. 13.

From the results it has been shown that the blending of a dilatant material has a beneficial effect on the impact performance of the Hytrel polyester copolymer. The foamed blends were measurably softer than the pure foamed Hytrel material yet outperformed the Hytrel in terms of force and pressure transmission during impact. Specifically the pure Hytrel transmitted had a reduction of transmitted about 19% more force than the 65/35 blend. Although difficult to quantify the pressure signatures also show an improvement in performance; the very sensitive superlow film shows the two blends to have an increased area of contact, but for the less sensitive medium film the contact area is smaller. This suggests that a lower peak pressure was transmitted for the blends (less of the medium film area being saturated) with a corresponding greater area for the more sensitive film indicating that the blend material has stiffened during impact to transmit the load through a greater volume (and therefore area) of the material. It should also be borne in mind that the softer blend materials had a thickness of around 10% less than the pure Hytrel foam.

Without wishing to be bound by theory, it is believed (though not ascertained) that because the second material ii) (which exhibits dilatancy in the absence of the first material i) is entrapped in the composite material of the invention in a solid matrix of i) its ability to flow is inhibited such that at high local deformation rate, its tendency to shear thicken is efficiently imparted to the unfoamed composite material which thereby exhibits a resistive load under deformation which increases with the rate of deformation.

Furthermore, where the composite material is foamed the gas or air within the cell will, by reason of its compressibility, allow the composite material to undergo larger amounts of local deformation thereby extending the opportunity of the composite material to stiffen during impact. In the above case where the cells are closed cells it is believed that additional pneumatic stretching of the cell walls gives rise to greater local elastic deformation.

What is claimed is:

1. A molded article comprising an un-comminuted composite material which is elastic, exhibits a resistive load under deformation which increases with the rate of deformation, and comprises:
   i) a first polymer-based elastic material comprising a polymer selected from the group consisting of elastomeric polyurethanes and synthetic thermoplastic elastomers; and
   ii) a second polymer-based material, comprising a polymer different from the polymer of i), which exhibits dilatancy in the absence of i) wherein ii) is entrapped in a solid matrix of i),
   the composite material being un-foamed and,
   the first material i) and second material ii) being in intimate admixture;
wherein the second material ii) forms from 5% to 80% by volume of the composite material.

2. A molded article according to claim 1 wherein the second material ii) forms from 10% to 50% by volume of the composite material.

3. A molded article according to claim 1 wherein the admixture is prepared by blending i) and ii) together.

4. A molded article according to claim 1 wherein the admixture is prepared by mixing i) and ii) in a semi-molten state or a molten state.

5. A molded article according to claim 1, wherein the polymer of the first material i) comprises an elastomeric polyurethane.

6. A molded article according to claim 1, wherein the polymer of the first material i) comprises a polyester.

7. A molded article according to claim 1 wherein the polymer of the second material ii) comprises a silicone polymer exhibiting dilatant properties.

8. A molded article according to claim 7 wherein the silicone polymer comprises a borated siloxane polymer.

9. A molded article according to claim 8 wherein the silicone polymer comprises a filled polyborodimethylsiloxane.

10. A process for the preparation of a molded article according to claim 1, which process includes the steps of:
   (a) melting the polymer of the first material i); and,
   (b) blending a polymeric dilatant of the second material ii) with the melted polymer of the first material i) to form the composite material.

11. A process according to claim 10 wherein the polymeric dilatant of the second material ii) comprises a silicone polymer exhibiting dilatant properties.

12. A process according to claim 10 comprising melting the polymeric dilatant prior to and/or during the blending step (b).

13. A molded article comprising the composite material prepared by the process of claim 10.

14. An impact protection system including a molded article as claimed in claim 1.

15. An impact protection system according to claim 14 which is self-molding in service.

16. A molded article according to claim 1 wherein the first material i) comprises an elastomeric polyurethane or an elastomeric polyester.

17. A molded article according to claim 1 wherein the first material i) comprises a synthetic thermoplastic elastomer.

18. A molded article according to claim 1, wherein:
   the polymer of the second material ii) comprises a silicone polymer exhibiting dilatant properties; and,
   the second material ii) forms from 15% to 40% by volume of the composite material.

19. A molded article in the form of a sheet, film, filament, or fiber, said molded article comprising a composite material which is elastic, exhibits a resistive load under deformation which increases with the rate of deformation, and comprises:
   i) a first polymer-based elastic material comprising a polymer selected from the group consisting of ethylene-vinyl acetate (EVA), elastomeric polyurethanes, and synthetic thermoplastic elastomers; and
   ii) a second polymer-based material, comprising a polymer different from the polymer of i), which exhibits dilatancy in the absence of i) wherein ii) is entrapped in a solid matrix of i),
   the composite material being un-foamed and,
   the first material i) and second material ii) being in intimate admixture;
wherein the second material ii) forms from 5% to 80% by volume of the composite material.

20. A molded article according to claim 19 in the form of a fiber.

21. A fiber according to claim 20 having a hollow core.

22. A fiber according to claim 20 wherein the second material ii) comprises a silicone polymer exhibiting dilatant properties.

23. A textile or web including filaments or fibers as claimed in claim 19.

24. An impact protection system associated with a rigid component, a semi-rigid component, or a textile layer, the impact protection system including a molded article comprising a composite material which is elastic, exhibits a resistive load under deformation which increases with the rate of deformation, and comprises:
   i) a first polymer-based elastic material comprising a polymer selected from the group consisting of ethylene-vinyl acetate (EVA), elastomeric polyurethanes, and synthetic thermoplastic elastomers; and
   ii) a second polymer-based material, comprising a polymer different from the polymer of i), which exhibits dilatancy in the absence of i) wherein ii) is entrapped in a solid matrix of i),
   the composite material being un-foamed; and
   the first material i) and second material ii) being in intimate admixture;
wherein the second material ii) forms from 5% to 80% by volume of the composite material.

25. A shaped article in the form of a sheet, film, filament or fiber comprising a composite material which is elastic, exhibits a resistive load under deformation which increases with the rate of deformation, and comprises:
   i) a first polymer-based elastic material comprising a polymer selected from the group consisting of ethylene-vinyl acetate (EVA), elastomeric polyurethanes, and synthetic thermoplastic elastomers; and ii) a second polymer-based material, comprising a polymer different from the polymer of i), which exhibits dilatancy in the absence of i) wherein ii) is entrapped in a solid matrix of i), the composite material being un-foamed and, the first material i) and second material ii) being in intimate admixture;

wherein the second material ii) forms from 5% to 80% by volume of the composite material.

26. A shaped article according to claim 25 in the form of a fiber.

27. A fiber according to claim 26 having a hollow core.

28. A fiber according to claim 26 wherein the second material ii) comprises a silicone polymer exhibiting dilatant properties.

29. The shaped article of claim 28 wherein the first polymer-based elastic material comprises a polymer selected from the group consisting of elastomeric polyurethanes and synthetic thermoplastic elastomers.

30. A textile or web including filaments or fibers as claimed in claim 25.

31. The shaped article of claim 25 wherein the first polymer-based elastic material comprises a polymer selected from the group consisting of elastomeric polyurethanes and synthetic thermoplastic elastomers.

32. An impact protection system including a shaped article comprising a composite material which is elastic, exhibits a resistive load under deformation which increases with the rate of deformation, and comprises:

i) a first polymer-based elastic material comprising a polymer selected from the group consisting of ethylene-vinyl acetate (EVA), elastomeric polyurethanes, and synthetic thermoplastic elastomers; and ii) a second polymer-based material, comprising a polymer different from the polymer of i), which exhibits dilatancy in the absence of i) wherein ii) is entrapped in a solid matrix of i), the composite material being un-foamed and, the first material i) and second material ii) being in intimate admixture;

wherein the second material ii) forms from 5% to 80% by volume of the composite material; and wherein impact protection system is associated with a rigid component or a semi-rigid component.

33. The impact protection system of claim 32 wherein the first polymer-based elastic material comprises a polymer selected from the group consisting of elastomeric polyurethanes and synthetic thermoplastic elastomers.

34. An impact protection system including a shaped article comprising a composite material which is elastic, exhibits a resistive load under deformation which increases with the rate of deformation, and comprises:

i) a first polymer-based elastic material comprising a polymer selected from the group consisting of ethylene-vinyl acetate (EVA), elastomeric polyurethanes, and synthetic thermoplastic elastomers; and ii) a second polymer-based material, comprising a polymer different from the polymer of i), which exhibits dilatancy in the absence of i) wherein ii) is entrapped in a solid matrix of i), the composite material being un-foamed and, the first material i) and second material ii) being in intimate admixture;

wherein the second material ii) forms from 5% to 80% by volume of the composite material; and wherein impact protection system is associated with textile layer.

35. The impact protection system of claim 34 wherein the first polymer-based elastic material comprises a polymer selected from the group consisting of elastomeric polyurethanes and synthetic thermoplastic elastomers.

\* \* \* \* \*